United States Patent
Chen et al.

(10) Patent No.: US 8,064,846 B2
(45) Date of Patent: Nov. 22, 2011

(54) RADIO FREQUENCY CIRCUIT

(75) Inventors: Shyue-Dar Chen, Taipei Hsien (TW); Chia-Yin Liao, Taipei Hsien (TW); Chi-Hsin Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 459 days.

(21) Appl. No.: 12/332,350

(22) Filed: Dec. 11, 2008

(65) Prior Publication Data
US 2010/0041346 A1    Feb. 18, 2010

(30) Foreign Application Priority Data

Aug. 13, 2008  (CN) ...................... 2008 2 0301814 U

(51) Int. Cl.
*H04B 1/44* (2006.01)
(52) U.S. Cl. ................. 455/78; 455/88; 455/20
(58) Field of Classification Search .......... 455/20, 455/78, 75, 80, 81, 82, 88, 129
See application file for complete search history.

(56) References Cited

U.S. PATENT DOCUMENTS

| | | | | |
|---|---|---|---|---|
| 7,130,579 | B1 * | 10/2006 | Rael et al. | 455/20 |
| 7,167,688 | B2 * | 1/2007 | Li et al. | 455/88 |
| 7,617,342 | B2 * | 11/2009 | Rofougaran | 710/100 |
| 2006/0223456 | A1 * | 10/2006 | Ouzillou | 455/78 |

* cited by examiner

*Primary Examiner* — Jean Jeanglaude
(74) *Attorney, Agent, or Firm* — Atlis Law Group, Inc.

(57) ABSTRACT

A RF circuit includes a master PCB, a plurality of slave PCBs and a plurality of antennas. The master PCB includes at least two RF ICs and at least two transceiving diplexer groups for tranceiving different frequency bands. Each transceiving diplexer group includes a plurality of transceiving diplexers transceiving a same frequency band and electrically connected to the RF ICs via PCB tracks without intersection. Each slave PCB includes a frequency division diplexer electrically connected to at least two transceiving diplexers respectively belonging to different tranceiving diplexer groups for respectively transmitting different frequency bands. Each antenna electrically connects to one of the division diplexers.

7 Claims, 2 Drawing Sheets

RADIO FREQUENCY CIRCUIT

BACKGROUND

1. Technical Field

The disclosure relates to radio frequency (RF) circuits and, specifically, to a dual-band RF circuit.

2. Description of Related Art

Wireless communication products using multiple transceiver paths have become more common and have made significant advances in both functionality and data transmission rate.

When a wireless communication device is operated in high and low frequency bands at the same time, two independent sets of transceiving components are required, such as (RF) integrated circuits (IC), transceiving diplexers, and others. Typically, a high frequency IC transmits a high frequency signal to a high frequency transceiving diplexer and a low frequency IC transmits a low frequency signal to a low frequency transceiving diplexer, and then subsequently to a common frequency division diplexer and further, to an antenna.

Referring to FIG. 1, a schematic diagram of a prior RF circuit is shown. A low frequency IC 101, a high frequency IC 102, low frequency transceiving diplexers 111, 113, 115, high frequency transceiving diplexers 112, 114, 116, and frequency division diplexers 121, 122, 123 are located on a printed circuit board (PCB) 10, wherein the low frequency transceiving diplexers 111, 113, 115 and the high frequency transceiving diplexers 112, 114, 116 are arranged in a staggered arrangement. The low frequency IC 101 transmits signals to the low frequency transceiving diplexers 111, 113, 115. The high frequency IC 102 transmits signals to the high frequency transceiving diplexers 112, 114, 116. The low frequency transceiving diplexer 111 and the high frequency transceiving diplexer 112 transmit signals to the frequency division diplexer 121. The low frequency transceiving diplexer 113 and the high frequency transceiving diplexer 114 transmit signals to the frequency division diplexer 122. The low frequency transceiving diplexer 115 and the high frequency transceiving diplexer 116 transmit signals to the frequency division diplexer 123. The frequency division diplexers 121, 122, 123 are connected to antennas 131, 132, 133 via coaxial-cables 141, 142, 143. In this RF circuit, signal transmission lines distributed on the PCB 10 intercross, and some signal transmission lines must be located between different layers of the PCB 10, increasing the circuit layout complexity and the RF path loss.

Therefore, it is desirable to provide a RF circuit that can overcome the limitations described.

DETAILED DESCRIPTION OF EMBODIMENTS

Figure 1:
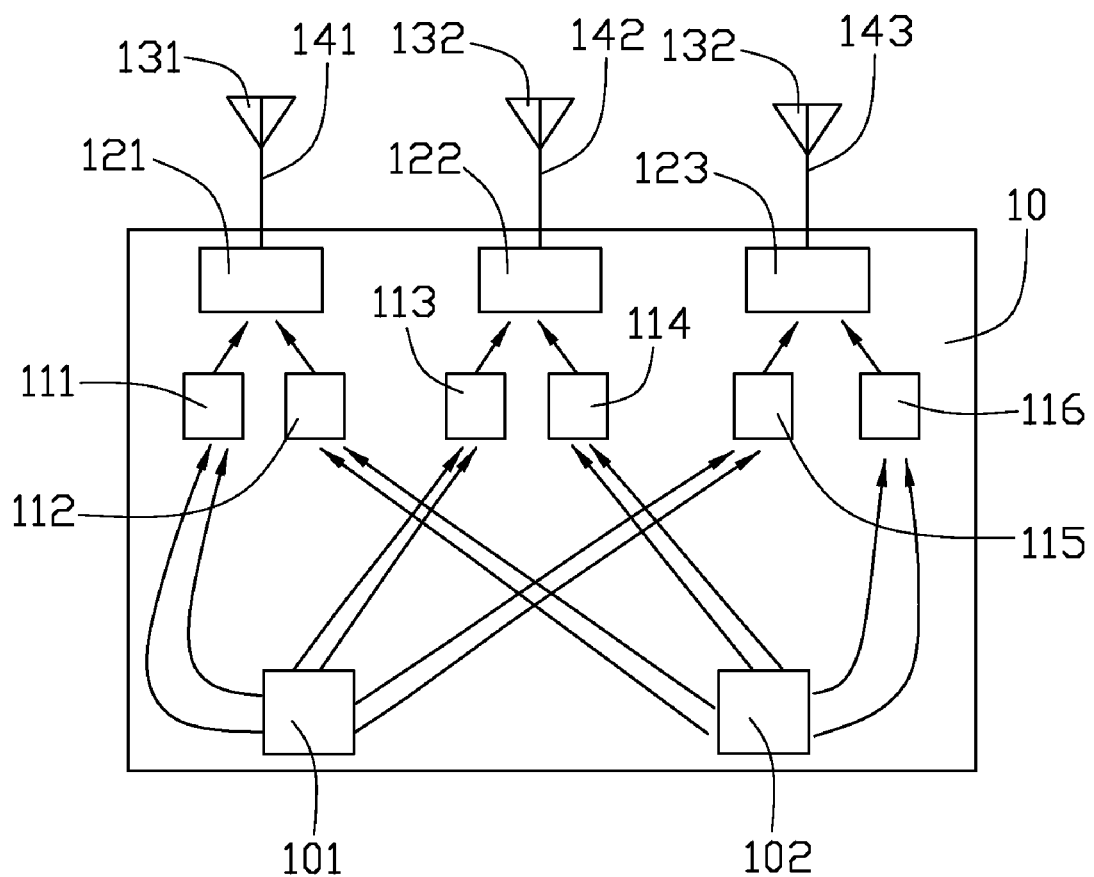
FIG. 1 is a schematic diagram of a commonly used RF circuit.
Figure 2:
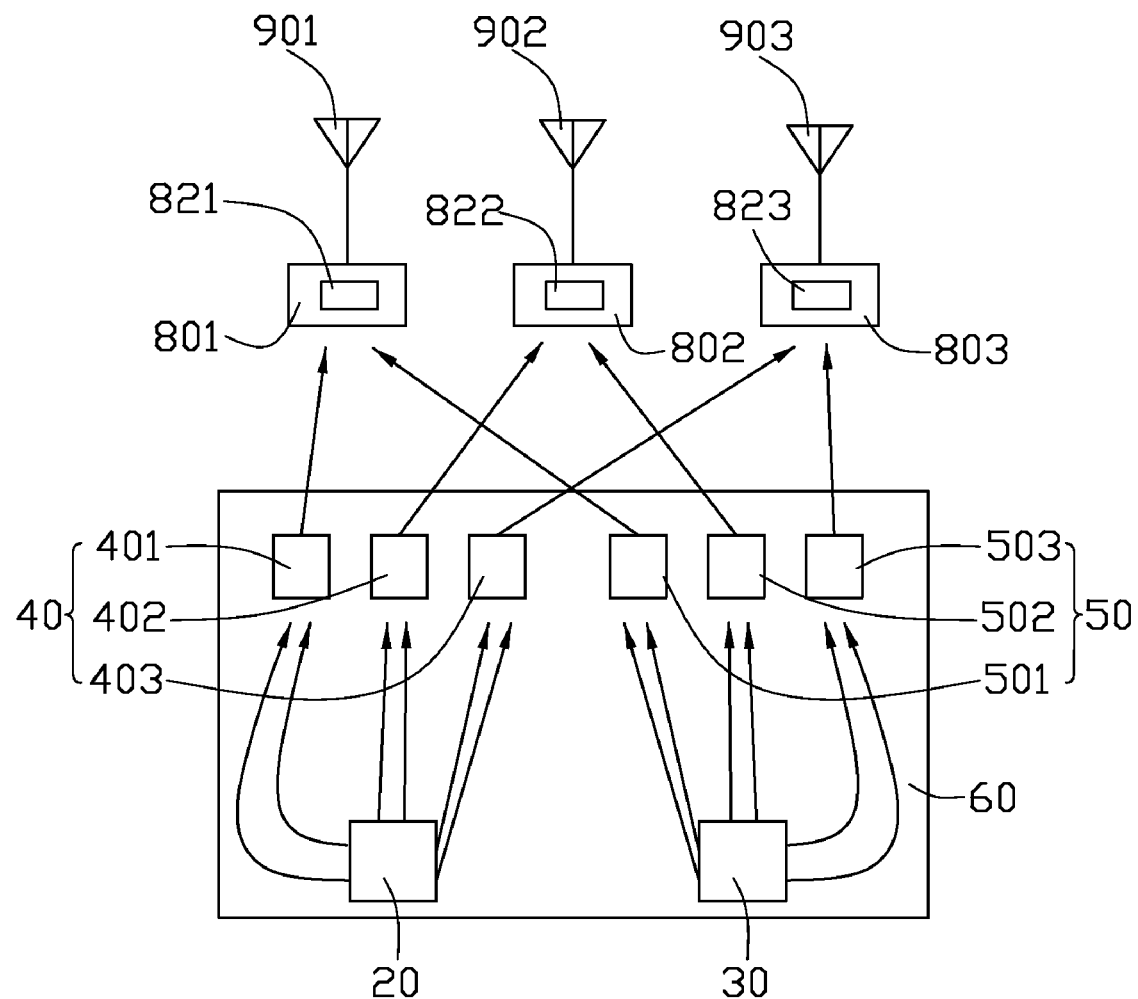
FIG. 2 is a schematic diagram of a RF circuit in accordance with an exemplary embodiment of the disclosure.

Referring to FIG. 2, an exemplary radio frequency (RF) circuit comprises a master printed circuit board (PCB) 60, a plurality of slave PCBs 801, 802, 803 and a plurality of antennas 901, 902, 903. In this embodiment, the number of antennas is equal to the number of slave PCBs.

At least two groups of electronic components for transceiving different frequency bands are arranged on the master PCB 60, each comprising an RF Integrated Circuit (IC) and a plurality of transceiving diplexers. The RF IC is electrically and commonly connected to the plurality of transceiving diplexers transceiving a same frequency band via PCB tracks without intersection.

For simplicity of description, a low frequency RF IC 20 and a high frequency RF IC 30, a low frequency transceiving diplexer group 40, and a high frequency transceiving diplexer group 50, are illustrated in FIG. 2. The low frequency transceiving diplexer group 40 comprises a plurality of low frequency transceiving diplexers 401, 402, 403, and the high frequency transceiving diplexer group 50 comprises a plurality of high frequency transceiving diplexers 501, 502, 503. The low frequency IC 20 substantially corresponds and electronically connects to the low frequency transceiving diplexers 401, 402, 403, and the high frequency IC 30 substantially corresponds and electronically connects to the high frequency transceiving diplexers 501, 502, 503. The connections between the low frequency IC 20 and the low frequency transceiving diplexers 401, 402, 403 do not interleave with each other nor with the connections between the high frequency IC 30 and the high frequency transceiving diplexers 501, 502, 503.

Each slave PCB may comprise an individual frequency division diplexer. For example, the slave PCB 801 can comprise a frequency division diplexer 821, the slave PCB 802 can comprise a frequency division diplexer 822 and the slave PCB 803 can comprise a frequency division diplexer 823. Each frequency division diplexer 821, 822, 823 is connected to two transceiving diplexers that transceive different frequency bands. For instance, the low frequency transceiving diplexer 401 and the high frequency transceiving diplexer 501 can be electrically connected to the frequency division diplexer 821, the low frequency transceiving diplexer 402 and the high frequency transceiving diplexer 502 can electrically connect to the frequency division diplexer 822, and the low frequency transceiving diplexer 403 and the high frequency transceiving diplexer 503 can electrically connect to the frequency division diplexer 823. The electrical connections between the frequency division diplexers 821, 822, 823 and the transceiving diplexers 401, 501, 402, 502, 403, 503 are realized by coaxial cables.

The frequency division diplexers 821, 822, 823 are respectively and electrically connected to the antennas 901, 902, 903. The electrical connections between the frequency division diplexers 821, 822, 823 and the antennas 901, 902, 903 are realized by connectors or coaxial cables. The frequency division diplexers 821, 822, 823 can be configured as a single electronic component and welded on the slave PCBs 801, 802, 803 via surface mount technology (SMT). In other applications, the frequency division diplexers 821, 822, 823 can be configured as a combination of a high-pass filter (HPF) and a low-pass filter (LPF), or the frequency division diplexers 821, 822, 823 can be circuits with HPF and LPF function designed on the slave PCBs 801, 802, 803.

In the master PCB 60 of the disclosed RF circuit, there is no interleaving among the PCB tracks, and layout thereof is simplified.

While exemplary embodiments have been described, it should be understood that they have been presented by way of example only and of limitation. The breadth and scope of the disclosure should not be limited by the described exemplary embodiments, but only in accordance with the following claims and their equivalents.

What is claimed is:

1. A radio frequency (RF) circuit, comprising:
a master printed circuit board (PCB) configured with at least two radio frequency integrated circuits (RF IC) and at least two transceiving diplexer groups respectively and electrically connected to the at least two RF ICs for transceiving different frequency bands, each transceiving diplexer group comprising a plurality of transceiving diplexers transceiving a same frequency band and electrically and commonly connected to one of the RF ICs via PCB tracks without intersection;
a plurality of slave PCBs, each slave PCB being configured with a frequency division diplexer electrically connected to at least two transceiving diplexers respectively belonging to different transceiving diplexer groups for respectively transmitting different frequency bands; and
a plurality of antennas each electrically connected to one of the frequency division diplexers; wherein the frequency division diplexers are electrically connected to the transceiving diplexers via coaxial cables.

2. The RF circuit as claimed in claim 1, wherein the frequency division diplexers are configured as circuits with high-pass filter and low-pass filter function.

3. The RF circuit as claimed in claim 1, wherein the frequency division diplexers are configured as a combination of a high-pass filter and a low-pass filter.

4. The RF circuit as claimed in claim 1, wherein the frequency division diplexers are welded on the slave PCBs.

5. The RF circuit as claimed in claim 1, wherein the frequency division diplexers are configured as circuits with high-pass filter and low-pass filter function designed on the slave PCBs.

6. The RF circuit as claimed in claim 1, wherein the frequency division diplexers are configured as a combination of a high-pass filter and a low-pass filter.

7. A radio frequency (RF) circuit, comprising:
at least two radio frequency integrated circuits (RF IC) respectively processing different frequency band signals;
at least two transceiving diplexer groups respectively and electrically connected to the at least two RF ICs, each transceiving diplexer group comprising a plurality of transceiving diplexers that transceives the same frequency band signals and electrically and commonly connects to one of the RF ICs via PCB tracks without intersection;
a plurality of frequency division diplexers each electrically connected to at least two transceiving diplexers respectively belonging to different transceiving diplexer groups for respectively transmitting different frequency band signals; and
a plurality of antennas each electrically connected to one of the frequency division diplexers;
wherein the frequency division diplexers are electrically connected to the transceiving diplexers via coaxial cables.

* * * * *